US012558902B2

(12) United States Patent
Orihara et al.

(10) Patent No.: US 12,558,902 B2
(45) Date of Patent: Feb. 24, 2026

(54) LIQUID INJECTION METHOD, LIQUID INJECTION DEVICE, AND LIQUID CARTRIDGE

(71) Applicant: CANON KABUSHIKI KAISHA, Tokyo (JP)

(72) Inventors: Tatsuaki Orihara, Tokyo (JP); Shinichi Sakurada, Tokyo (JP); Nobuyuki Kuwabara, Tokyo (JP); Sachiko Yamauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 18/465,871

(22) Filed: Sep. 12, 2023

(65) Prior Publication Data

US 2023/0415485 A1 Dec. 28, 2023

Related U.S. Application Data

(63) Continuation of application No. PCT/JP2022/012450, filed on Mar. 17, 2022.

(30) Foreign Application Priority Data

Mar. 18, 2021 (JP) ................................ 2021-044721
Mar. 10, 2022 (JP) ................................ 2022-037145

(51) Int. Cl.
*B41J 2/175* (2006.01)
*B41J 2/14* (2006.01)

(52) U.S. Cl.
CPC ............ *B41J 2/17523* (2013.01); *B41J 2/14* (2013.01); *B41J 2002/14411* (2013.01)

(58) Field of Classification Search
CPC ................................ B41J 2/17523; B41J 2/14; B41J 2002/14411; B41J 2/17513; B41J 2/1753;
(Continued)

(56) References Cited

U.S. PATENT DOCUMENTS 5,638,101 A 6/1997 Keefe et al. ............ B41J 2/175
9,914,305 B2 3/2018 Orihara et al. .......... B41J 2/175
(Continued)

FOREIGN PATENT DOCUMENTS

JP H10-86400 4/1998
JP 2005062022 A 3/2005
(Continued)

OTHER PUBLICATIONS

International Search Report (translation) in counterpart Application No. PCT/JP2022/012450.
(Continued)

*Primary Examiner* — Jason S Uhlenhake
*Assistant Examiner* — Alexander D Shenderov
(74) *Attorney, Agent, or Firm* — Venable LLP

(57) ABSTRACT

A liquid injection method of injecting a liquid from a liquid injector to a liquid cartridge including a liquid ejection head that ejects the liquid, a channel that is connected to the liquid ejection head and is capable of supplying the liquid to the liquid ejection head, and an opening portion that is connected to the channel and is provided to be wider than the channel, wherein the channel is a groove, and the liquid is injected from the liquid injector into the liquid cartridge including the channel in which an aspect ratio obtained by dividing a depth of the channel by a width of the channel is six or more. The method includes directly injecting the liquid into the channel.

28 Claims, 7 Drawing Sheets

(58) Field of Classification Search
CPC . B41J 2/17553; B01L 2200/027; C12M 33/04
USPC ........................................................... 347/86
See application file for complete search history.

(56) References Cited

U.S. PATENT DOCUMENTS

| | | | | |
|---|---|---|---|---|
| 10,093,105 | B2 | 10/2018 | Shimamura et al. | B41J 2/175 |
| 10,112,403 | B2 | 10/2018 | Ikebe et al. | B41J 29/13 |
| 10,399,346 | B2 | 9/2019 | Arai et al. | B41J 2/175 |
| 10,399,347 | B2 | 9/2019 | Miyashita et al. | B41J 2/175 |
| 10,427,412 | B2 | 10/2019 | Okude et al. | B41J 2/175 |
| 10,538,092 | B2 | 1/2020 | Miyashita et al. | B41J 2/175 |
| 10,611,162 | B2 | 4/2020 | Ikebe et al. | B41J 2/175 |
| 10,618,300 | B2 | 4/2020 | Shimamura et al. | B41J 2/175 |
| 10,843,474 | B2 | 11/2020 | Arai et al. | B41J 2/175 |
| 11,192,383 | B2 | 12/2021 | Shimamura et al. | B41J 2/175 |
| 11,623,453 | B2 | 4/2023 | Shimamura et al. | B41J 2/175 |
| 2007/0200898 | A1* | 8/2007 | Ueno | B41J 2/04581 347/55 |
| 2010/0238242 | A1 | 9/2010 | Rittgers et al. | B41J 2/175 |
| 2013/0137166 | A1* | 5/2013 | Wilson | G01N 35/0092 435/283.1 |
| 2015/0145934 | A1 | 5/2015 | Kaneko et al. | B41J 2/175 |
| 2017/0045507 | A1 | 2/2017 | Khattak et al. | G01N 33/543 |
| 2019/0299621 | A1* | 10/2019 | Kashimoto | B41J 2/16538 |
| 2020/0139704 | A1 | 5/2020 | Muramatsu et al. | B41J 2/14 |
| 2022/0118681 | A1 | 4/2022 | Sexton et al. | B29C 64/112 |

FOREIGN PATENT DOCUMENTS

| | | | |
|---|---|---|---|
| JP | 2006-159656 | 6/2006 | |
| JP | 2016-007719 | 1/2016 | |
| JP | 2016-041504 | 3/2016 | |
| JP | 2019525139 A | 9/2019 | |
| JP | 2020-080819 | 6/2020 | |
| JP | 2020-092692 | 6/2020 | |
| WO | WO-2016157867 A1 * | 10/2016 | B05B 1/02 |
| WO | 2020/113280 | 6/2020 | |

OTHER PUBLICATIONS

Extended European Search Report dated Jan. 27, 2025 in counterpart EP Application No. 22771526.5.

Japanese Office Action issued Dec. 16, 2025, in Corresponding Japanese Application No. 2022-037145 (13 pages).

* cited by examiner

LIQUID INJECTION METHOD, LIQUID INJECTION DEVICE, AND LIQUID CARTRIDGE

CROSS-REFERENCE TO RELATED APPLICATIONS

This application is a continuation of International Patent Application No. PCT/JP2022/012450, filed Mar. 17, 2022, which claims the benefit of Japanese Patent Applications No. 2021-044721, filed Mar. 18, 2021 and No. 2022-037145, filed Mar. 10, 2022, all of which are hereby incorporated by reference herein in their entirety.

BACKGROUND OF THE INVENTION

Field of the Invention

The present invention relates to a liquid injection method, a liquid injection device, and a liquid cartridge.

Background Art

Japanese Patent Laid-Open No. 2006-159656 (the '656 document) discloses a method of injecting an ink evenly within a short period of time into an ink retaining member housed in an ink tank by inserting ink injection needles into the ink retaining member.

In the method of the '656 document, it is necessary to additionally guide the ink injected in the ink retaining member to ejection ports by suction from the ejection ports or the like. However, there is a problem that the suction also discharges the ink to no small extent from the ejection ports and therefore leads to a wasteful consumption of the ink.

In view of the above, the present invention provides a liquid injection method, a liquid injection device, and a liquid cartridge capable of suppressing a wasteful consumption of a liquid.

SUMMARY OF THE INVENTION

To this end, a liquid injection method of the present invention is to eject a liquid from an ink injector to a liquid cartridge including a liquid ejection head that ejects the liquid, a channel that is connected to the liquid ejection head and is capable of supplying the liquid to the liquid ejection head, and an opening portion that is connected to the channel and is provided to be wider than the channel, and is characterized by including directly injecting the liquid into the channel.

Further features of the present invention will become apparent from the following description of exemplary embodiments with reference to the attached drawings.

DESCRIPTION OF THE EMBODIMENTS

Hereafter, the present invention will be further described by taking preferred embodiments, but the present invention should not be limited to the following embodiments. Unless otherwise specified, physical properties in the present description are values at normal temperature (25° C.).

First Embodiment

Hereafter, a first embodiment of the present invention will be described with reference to the drawings.

Figure 1A:
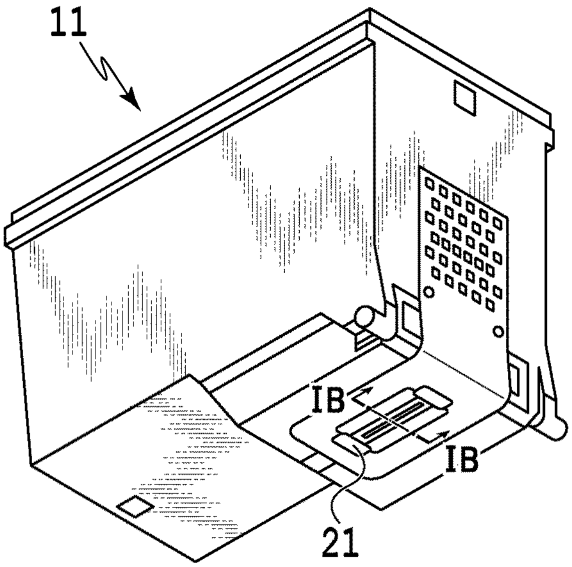
FIG. 1A includes diagrams illustrating a liquid cartridge.
Figure 1B:
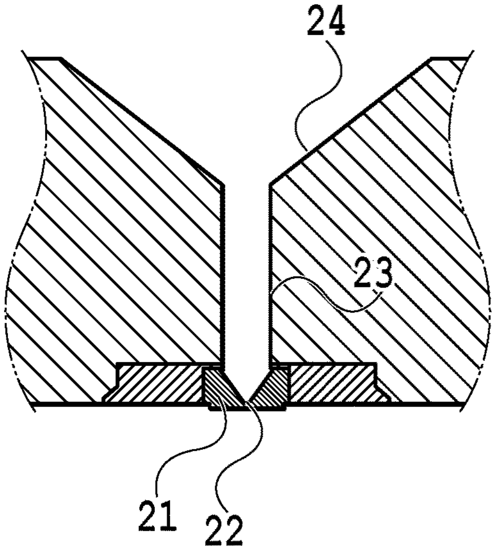
FIG. 1B includes diagrams illustrating a liquid cartridge.
Figure 1C:
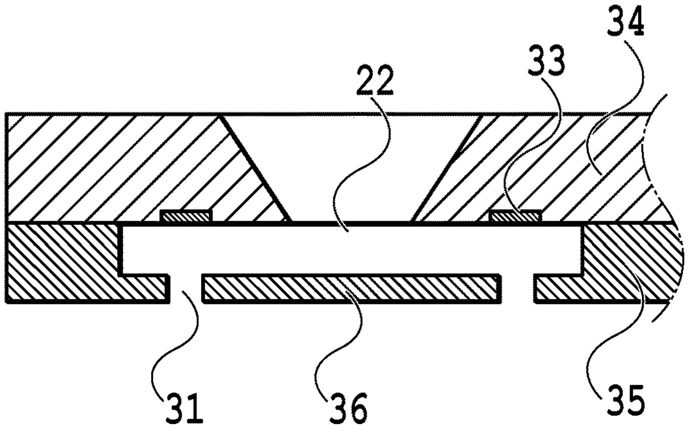
FIG. 1C includes diagrams illustrating a liquid cartridge.

FIG. 1A is a perspective view illustrating a liquid cartridge 11 in the present embodiment, FIG. 1B is a view illustrating a cross section taken along IB-IB in FIG. 1A, and FIG. 1C is a partial enlarged view of a liquid ejection head 21 in FIG. 1B. The liquid cartridge 11 includes an opening portion 24 and a channel 23 provided between the opening portion 24 and the liquid ejection head 21. The liquid ejection head 21 ejects a liquid using an ejection principle of an inkjet method. The channel 23 is configured to be able to supply the liquid to the liquid ejection head 21, and is tapered so as to efficiently guide the liquid to a narrow common supply channel 22 of the liquid ejection head 21. The opening portion 24 is also able to store the liquid, includes a slope leading to the channel 23, and is formed to spread from the channel 23 with the slope. The liquid supplied from the channel 23 to the liquid ejection head 21 is supplied to ejection ports 31 through the supply channel 22 of the liquid ejection head 21. The liquid supplied to the ejection ports 31 is ejected from the ejection ports 31 by an action of heating elements 33.

The liquid ejection head 21 includes a silicon substrate 34, the heating elements 33 formed therein, the ejection ports 31 formed in an ejection port forming member 35, and so on. The supply channel (hereafter also referred to as the common supply channel) 22 and the channel 23 are attached to communicate with each other. A total of three hundred twenty ejection ports 31 are arranged at predetermined intervals in a longitudinal direction on both sides of the supply channel 22.

Figure 2A:
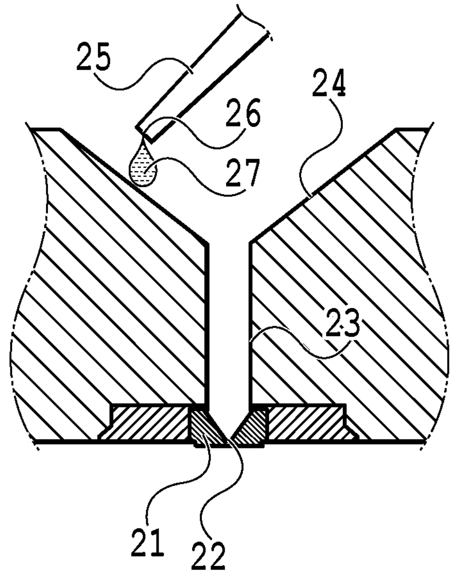
FIG. 2A includes diagrams illustrating dropping of a liquid onto an opening portion.
Figure 2B:
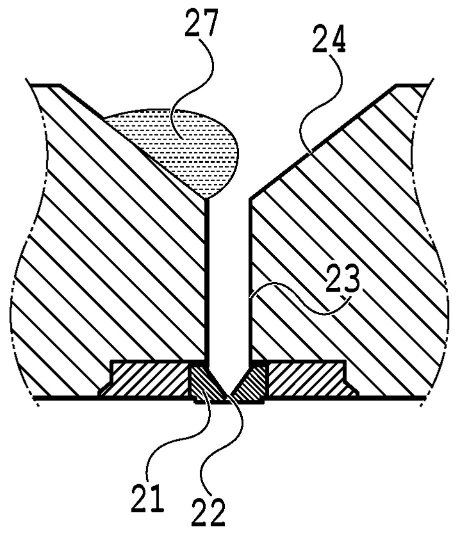
FIG. 2B includes diagrams illustrating dropping of a liquid onto an opening portion.
Figure 2C:
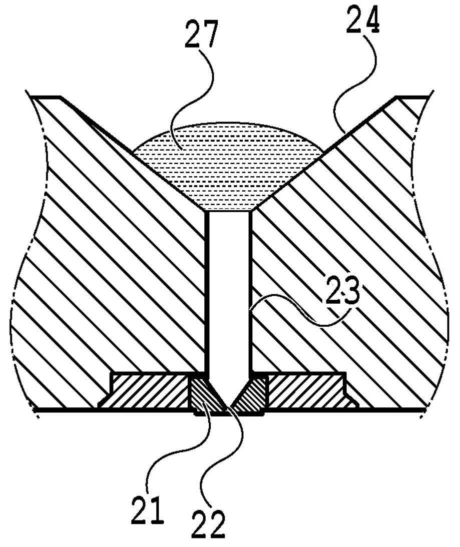
FIG. 2C includes diagrams illustrating dropping of a liquid onto an opening portion.

FIGS. 2A to 2C are diagrams illustrating dropping of a liquid onto the opening portion 24. Here, it was examined whether the liquid ejection head 21 could be filled with a liquid by dropping the liquid onto the slope of the opening portion 24 by use of a micropipette as a liquid injector. In this examination, pure water 27 was used as a representative example of a liquid difficult to fill. As illustrated in FIG. 2A, the pure water 27 was dropped onto the slope of the opening portion 24 by using a pipette tip 25 of the micropipette. After that, as illustrated in FIG. 2B, the pure water 27 was repelled by a pinning effect of wetting at an angled portion of a connecting portion between the opening portion 24 and the channel 23 and did not flow into the channel 23. As the dropping continued, as illustrated in FIG. 2C, the pure water 27 formed a meniscus at the connecting portion between the opening portion 24 and the channel 23 and stayed by covering the channel 23, so that the liquid ejection head 21 was not filled with the pure water 27.

In sum, in the case when the liquid was dropped onto the slope of the opening portion 24, the liquid ejection head 21 could not be filled with the liquid by simple dropping. The liquid ejection head 21 could not be filled with the liquid without suction of the liquid from the liquid ejection head 21 side or the like.

Figure 3A:
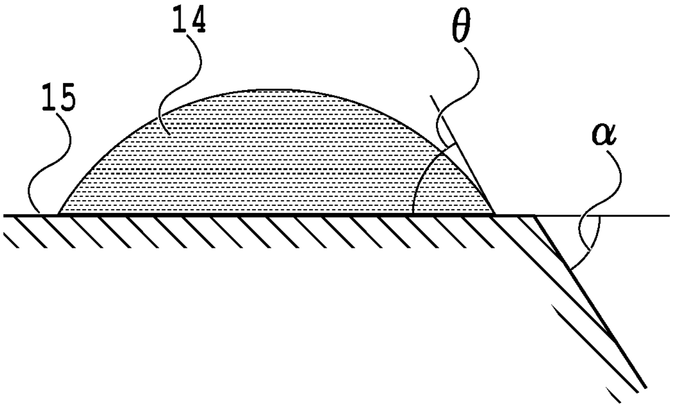
FIG. 3A includes diagrams for explaining a pinning effect of wetting.
Figure 3B:
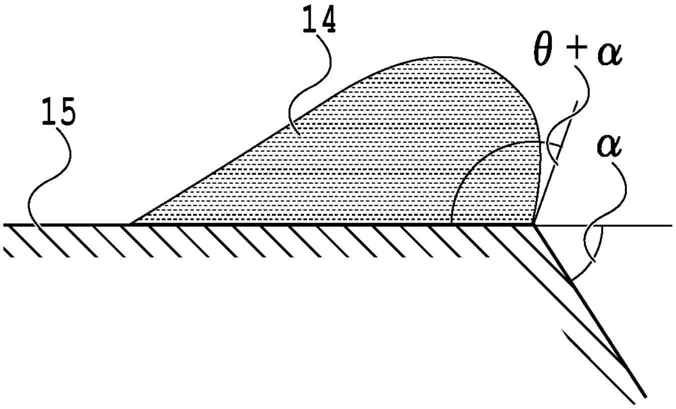
FIG. 3B includes diagrams for explaining a pinning effect of wetting.
Figure 3C:
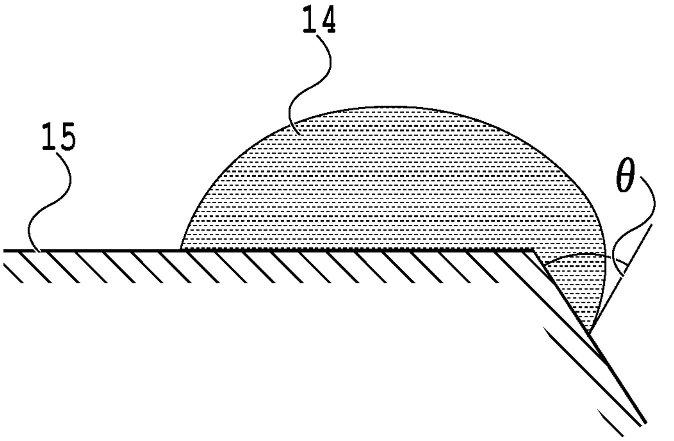
FIG. 3C includes diagrams for explaining a pinning effect of wetting.

FIG. 3 is a diagram for explaining the pinning effect of wetting. The pinning effect of wetting is a phenomenon in which, arriving at a surface having a bent portion, a droplet having a contact angle $\theta$ cannot proceed further until the contact angle increases to a contact angle $\theta+\alpha$, that is, the contact angle $\theta$ just plus a bending angle $\alpha$. Even if the bending angle $\alpha$ is rounded, it is still difficult for the droplet to proceed. The droplet having the contact angle $\theta$ as illustrated in FIG. 3A cannot pass over the surface having the bent portion and stays there until the contact angle becomes the contact angle $\theta+\alpha$ as illustrated in FIG. 3B. With the contact angle $\theta+\alpha$, the droplet passes over the surface having the bent portion and proceeds as illustrated in FIG. 3C. However, in the case when a place, to which a droplet proceeds after passing over a surface having a bent portion is narrow, as illustrated in FIG. 2B, the pure water 27 covers the channel 23 before passing over the bent portion and stays on the opening portion 24 as illustrated in FIG. 2C.

To address this, in the present embodiment, the liquid is directly injected into the channel 23 with a micropipette in order to avoid the aforementioned covering of the channel 23 due to the pinning effect of wetting.

Figure 4:
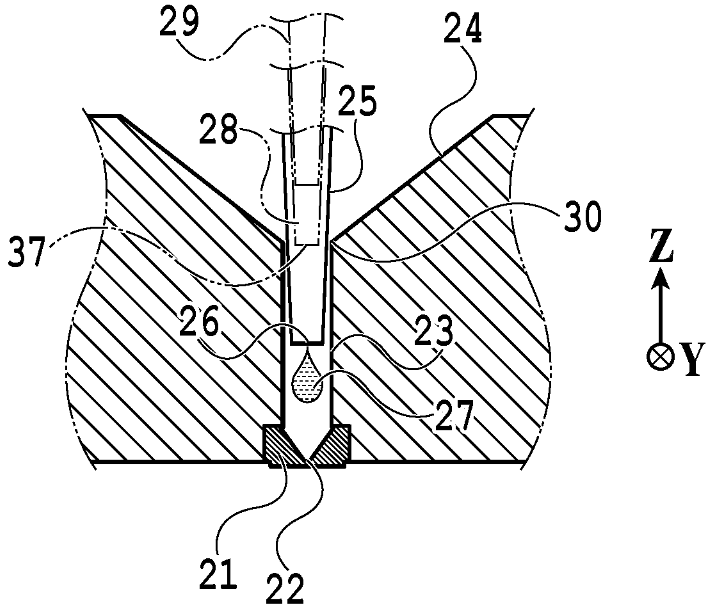
FIG. 4 is a diagram illustrating a method of injecting a liquid with a micropipette.

FIG. 4 is a view illustrating a liquid injection method with a micropipette in the present embodiment. The pipette tip 25 of the micropipette is gradually tapered toward the tip with its outer shape inclined. Meanwhile, the liquid cartridge 11 includes the channel 23 into which a liquid can be directly injected. In the present embodiment, as illustrated in FIG. 4, a tip 26 of the pipette tip 25 (liquid injection unit) was directly inserted into the channel 23 to inject the pure water 27. As a result, the pure water 27 reached the common supply channel 22 of the liquid ejection head 21 from the channel 23. In the case when the pure water 27 reached the common supply channel 22, the liquid ejection head 21 was filled with the pure water 27 due to an action of capillary force and wettability.

The sufficient amount of the pure water 27 to fill the liquid ejection head 21 is several tens of µl, and no pure water 27 was wasted by being discharged from the ejection ports 31. Having a high surface tension, the pure water 27 is known to be difficult to fill in general. Since the pure water 27 is easily filled in the method of the present embodiment, it is apparent that the liquid ejection head 21 can be similarly filled with a liquid having a surface tension lower than that of the pure water 27.

In this way, the pipette tip 25 of the micropipette is inserted into the channel 23 to inject the pure water 27 therein. Thus, it is possible to fill the liquid ejection head 21 with the pure water 27 without performing suction from a face surface 36 (see FIG. 1C) of the liquid ejection head 21 or pressurization from the opening portion side.

Here, the tip of the pipette tip does not have to be inserted into the channel 23. A structure like a pipette tip 28 may be employed in which a tip 37 of the pipette tip 28 is placed at substantially the same position as a connecting portion 30 between the opening portion 24 and the channel 23 in an arrow Z direction and a droplet discharged from the pipette tip 28 is directly injected into the channel 23 without passing the opening portion 24.

Moreover, the size of a droplet discharged from the pipette tip 25 is controlled so that the diameter of the droplet is smaller than the width of the channel 23. Then, as illustrated as a pipette tip 29, the liquid may be directly injected into the channel 23 from above the channel 23 without passing the opening portion 24.

Figure 5:
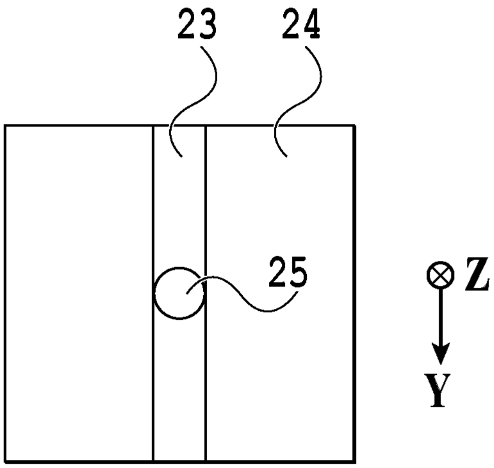
FIG. 5 is a diagram illustrating a channel with a pipette tip inserted therein.

FIG. 5 is a view of a state where the pipette tip 25 of the micropipette is inserted into the channel 23 seen from the opening portion 24 side. In FIG. 4, the channel 23 appears to be covered with the pipette tip 25 of the micropipette inserted into the channel 23. However, as illustrated in FIG. 5, the channel 23 is formed in a groove shape extending in an arrow Y direction, and is not covered even if the pipette tip 25 is inserted into the channel 23. Therefore, even if the pipette tip 25 is inserted into the channel 23 for injecting the pure water 27 into the channel 23, the air inside the channel 23 can flow out to the opening portion 24 side from communicating portions of the channel 23 into which the pipette tip 25 is not inserted.

Instead, the channel 23 may be covered with the micropipette on the opening portion 24 side. This is presumably because, even if the channel 23 is covered with the micropipette, the air present in the channel 23 and the common supply channel 22 of the liquid ejection head 21 can gradually flow out from the ejection ports 31. However, from the viewpoint of smoother filling, it is preferable that part of the channel 23 communicate with the atmosphere on the opening portion 24 side even in a state where the pipette tip 25 is inserted in the channel 23.

As the injection continued further after the liquid ejection head 21 was filled with the pure water 27, the pure water 27 was pooled in the opening portion 24 above the connecting portion between the channel 23 and the opening portion 24. From this state, the pure water 27 was taken out while the pipette tip 25 was kept inserted in the channel 23. As a result, the pure water 27 pooled in the opening portion 24 flowed into the channel 23 without being pinned. This is presumably because the pure water 27 already existing in the channel 23 and the pure water 27 pooled in the opening portion 24 are not separated as droplets but are integrated as a bulk liquid.

Moreover, it is preferable to lower the wettability of the wall surfaces of the channel 23 and the opening portion 24 because the amount of the liquid remaining in the form of adhering to the wall surfaces is reduced. The contact angle of pure water on at least one of the wall surfaces of the channel 23 and the opening portion 24 is preferably 90° or more. The contact angle can be measured in a known method.

The ejection port forming member 35 (see FIG. 1C) for forming the ejection ports 31 preferably has high wettability in order to naturally guide the liquid to the liquid ejection head 21. However, if the wettability is too high, the ejection port forming member 35 may adsorb components in the liquid and cause clogging. To avoid this, it is preferable that a micro-drop contact angle of pure water on the surface of the ejection port forming member 35 be 40° or more and 90° or less. The micro-drop contact angle can be measured in a known method.

In the above description, pure water is used as the liquid to be injected into the channel 23. Instead of the pure water, a liquid for use may be a liquid for coloring such as black or color to be used for image formation. Further, the liquid may be a resist, a metal nanoparticle solution, a carbon nanotube solution, an ultraviolet curing material, a functional polymer solution, DNA, a cell fluid, or the like. The liquids listed herein are just examples and the liquid is not particularly limited to them. The advantage of no waste of a liquid is exerted more in the case when a liquid is expensive or available only in a small amount, or when a liquid with poor wettability is used.

For example, a liquid containing at least one kind of cells, nucleic acids, proteins, labeling substances, hormones, and ribonucleotides for use in the field of biotechnology is suitable as the liquid of the present embodiment. As an example, in an application using a cell suspension, the liquid in a small amount of 100 μl or less is handled in some cases. With application of the present embodiment, it is possible to fill the liquid ejection head 21 with even such a small amount of a liquid without suction from the face surface 36 or the like. Since an aseptic operation is important in the field of biotechnology, one of the advantages is that there is no risk of contamination because of no need to bring a suction member into contact with the face surface 36. In addition, the liquid cartridge is preferably sterilized. As a cell type, adherent cells having the properties of adhering to a wall surface are often used. Even in this case, the adherent cells can be inhibited from adhering to the wall surface if the wettability (the contact angle and the micro-drop contact angle) of the channel 23, the opening portion 24, and the ejection port forming member 35 is set within the preferred ranges described above. In addition, in the case when a liquid to be injected into the channel 23 is a liquid containing at least one kind of cells, nucleic acids, proteins, labeling substances, hormones, and ribonucleotides, it is preferable that a time from the injection to the ejection be short from the viewpoint of the ejection performance. Specifically, the time from the injection of a liquid into a channel capable of supplying the liquid to the liquid ejection head to the ejection of the liquid from the ejection ports of the liquid ejection head is preferably ten minutes or shorter, more preferably five minutes or shorter, and even more preferably two minutes or shorter.

In the case when the inside of the liquid ejection head 21 is wet with liquid, it is preferable to remove the liquid by drying, or the like, before the injection of a liquid. This is because if the inside of the liquid ejection head 21 is wet with liquid, fine bubbles may be generated, which may make filling difficult. For example, in the case of use in the field of biotechnology as described above, the liquid ejection head is sterilized by heated steam in some cases, but such an operation tends to cause water to accumulate in the liquid ejection head. In such a case, it is preferable to dry the inside of the liquid ejection head 21 in advance before the injection of a liquid into the channel. In addition, depending on a kind of cells or, the like, contained in a liquid to be injected, the liquid has to be handled at a temperature lower than room temperature (25° C.). However, in the case when the liquid ejection head is cooled from the room temperature to the temperature of the liquid to be injected, dew condensation may occur inside the liquid ejection head and, as a result, the liquid may not be ejected well. For this reason, it is preferable to perform liquid injection into the liquid ejection head in an atmosphere with a dew point lower than the temperature of a cell suspension.

The liquid is directly injected into the channel 23 with a micropipette 104 as described above. According to this, it is possible to provide a liquid injection method, a liquid injection device, and a liquid cartridge capable of suppressing a wasteful consumption of a liquid.

EXAMPLES

Hereafter, the present invention will be specifically described by taking Examples and Comparative Examples. However, the present invention should not be limited at all to Examples described below without departing from the scope of the present invention. Unless otherwise specified, "%" in the following description is based on a volume.

Example 1

In this example, a liquid, a liquid cartridge, a liquid injector, and a liquid injection device specified below were used to inject the liquid into the liquid cartridge. The liquid was injected with a liquid injection unit inserted in a channel.

(Liquid)

The liquid used in this example was a cell suspension tinted with trypan blue. This liquid was prepared as follows. RAW264.7, a cell line established from mouse monocytic leukemia, was purchased from the American Type Culture Collection. Then, the cell line was dispersed at a concentration of 2,000,000 cells/ml in 20 ml of a D-MEM (manufactured by Thermo Fisher Scientific K.K.) medium containing 10% FBS, 1% P/S (manufactured by Sigma-Aldrich), and 1% MEM-NEAA. After that, 2,000,000 cells were seeded in each polystyrene dish of 100 mm (manufactured by Corning Incorporated). The cells were grown by incubation at 37 degrees centigrade in the presence of 5% CO2. Two to four days later, it was confirmed that about 70% of the area of the bottom of the dish was covered with the cells. Thereafter, the supernatant medium was removed. Then, after rinsing with PBS, the cells were detached from the dish by using PBS containing 0.25% trypsin and 1 mM EDTA (manufactured by Thermo Fisher Scientific K.K.). Thereafter, the macrophages were collected from the dish. Here, FBS denotes fetal bovine serum, P/S denotes penicillin-streptomycin, MEM-NEAA denotes MEM non-essential amino acids, D-MEM denotes Dulbecco's Modified Eagle Medium, PBS denotes a phosphate buffered saline, and EDTA denotes ethylenediaminetetraacetic acid.

The above medium was added to the collected cell suspension in a sterilized centrifuge tube so that the total volume was 50 ml, followed by treatment for five minutes by a centrifuge (CF16RX II, manufactured by Hitachi, Ltd.) set at 4° C. and 90 G to sediment the cells. After the supernatant of the sedimented cell pellet was gently removed, he above medium was added to the cell pellet to obtain a cell suspension. This suspension was again cultured twice according to the operation described above.

In the third operation, a required number of cells were taken out into a separate centrifuge tube, followed by centrifugation, and the supernatant of the sedimented cell pellet was gently removed. After that, a 9:1 mixture of 1-fold phosphate buffered saline (1×PBS) (manufactured by Thermo Fisher Scientific K.K., pH=7.4) and a 0.4 wt/vol % trypan blue solution was added thereto, followed by stirring with a micropipette to obtain a liquid with a cell concentration of 1,000,000 cells/ml.

(Liquid Cartridge)

As the liquid cartridge 11 for use in this example, the liquid cartridge described with reference to FIGS. 1A to 1C was used. The length of the channel 23 was 6 mm and the width of the channel 23 was 1 mm, so that the aspect ratio of the channel 23 (the ratio of the length to the width) was 6. The channel 23 and the opening portion 24 were made of polypropylene and the contact angle of pure water on their wall surfaces was 105° as a result of measurement with a contact angle meter (DMo-701 manufactured by Kyowa Interface Science Co., Ltd). Further, the micro-drop contact angle of the ejection port forming member 35 was 55° as a result of measurement with a micro-drop contact angle meter (DropMeasure manufactured by MICROJET Corporation). In the measurement of the micro-drop contact angle on the ejection port forming member 35, the member was carefully cut out with a utility knife and the measurement was conducted on the side to come into contact with a liquid, that is, the surface opposite to the face surface.

(Liquid Injector)

As the liquid injector, a micropipette 104 (Reference 2, 20-200 μL, yellow, manufactured by Eppendorf SE) equipped with a pipette tip (epT.I.P.S., 2-200 μL, biopur manufactured by Eppendorf SE) was used.

(Liquid Injection Device)

Figure 6:
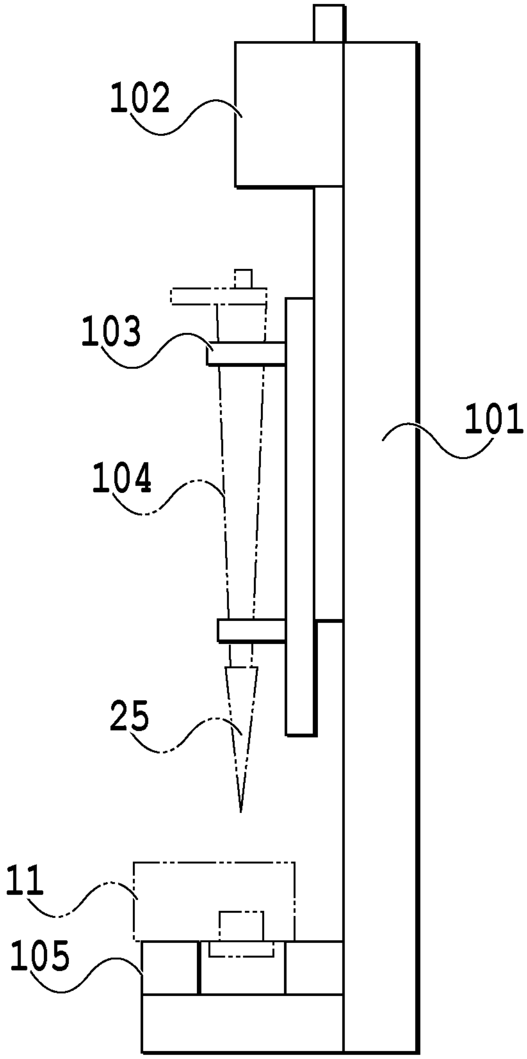
FIG. 6 is a diagram illustrating a liquid injection device.

FIG. 6 is a diagram illustrating a liquid injection device 101 used in this example. The liquid injection device 101 includes a holder 105 for the liquid cartridge 11 and a holder 103 for the micropipette 104, and has an adjustment mechanism capable of adjusting a relative positional relationship between them using a stage 102.

The micropipette 104 is configured such that the outer diameter of the tip is smaller than the width of the opening portion 24 and, moreover, the outer diameter of the tip is smaller than the width of the channel 23.

The liquid injection device 101 is a device that holds the liquid cartridge 11 and the micropipette 104 (liquid injector), and is capable of controlling the relative position between the liquid cartridge 11 and the micropipette 104 and controlling an injection operation. Moreover, the liquid injection device 101 may include a liquid injector.

In this example, the pre-dried liquid cartridge 11 and the micropipette 104 containing 50 μl of the liquid measured were attached to the liquid injection device 101, and the stage 102 was moved to insert the pipette tip 25 of the micropipette 104 into the channel 23.

With the pipette tip 25 inserted into the channel 23, a discharge button of the micropipette 104 was pressed to inject the liquid into the liquid cartridge 11. At this time, the channel 23 was not covered with the pipette tip 25 and communicated with the atmosphere on the opening portion 24 side, so that the liquid ejection head 21 was successfully filled with the liquid injected.

(Evaluation)

The liquid cartridge 11 was attached to a serial type ink jet printing apparatus (not illustrated), and ten shots of the liquid were sequentially ejected from each ejection port onto paper. The time from the liquid injection to the ejection was five minutes. Since the liquid was tinted with the trypan blue, the ejection results could be judged visually. The liquid was ejected from all the three hundred twenty ejection ports and non-ejection did not occur. After that, one thousand shots were ejected sequentially from each ejection port. As a result, the ejection was stable and non-ejection did not occur.

Observation of the channel 23 after the ejection revealed that the wall surface of the channel 23 was not wet and no liquid was wasted by adhering to the wall surface.

Comparative Example 1

Comparative Example 1 was conducted in the same method as in Example 1 except that the pipette tip 25 was not inserted into the channel 23 and the liquid was dropped onto the wall surface of the opening portion 24. As a result, the operation of sequentially ejecting ten shots from each ejection port 31 was performed, but non-ejection occurred in all the ejection ports 31. After that, the operation of sequentially ejecting one thousand shots from each ejection port 31 was performed, but non-ejection occurred in all the ejection ports.

Comparative Example 2

As in Comparative Example 1, 200 μl of the liquid was dropped onto the wall surface of the opening portion 24. Then, the liquid was sucked by an aspirator from the face surface of the liquid ejection head 21, so that the liquid ejection head 21 was forcibly filled with the liquid. Besides the above, the liquid was injected in the same method as in Comparative Example 1. Consequently, as a result of sequential ejection of 10 shots from each ejection port, the liquid was ejected from all the 320 ejection ports and non-ejection did not occur. However, the measured amount of the liquid sucked into the aspirator was 100 μl and the liquid sucked into the aspirator was wasted.

Example 2

The evaluation was made in the same method as in Example 1 except that the channel 23 and the opening portion 24 were formed of an ABS resin. The contact angle of pure water on this ABS resin was 75°. Non-ejection did not occur, but observation of the channel 23 after the ejection revealed that the wall surface of the channel 23 was slightly wet with the liquid and a small amount of the liquid remained on the wall surface, but it was not at a level considered as a problem.

Example 3

The evaluation was made in the same method as in Example 1 except that the micro-drop contact angle of pure water on the ejection port forming member 35 was 25°. As a result of sequential ejection of ten shots from each ejection port, non-ejection occurred in thirty ejection ports. It is considered that the cells adhered to the ejection port forming member 35 and the ejection ports 31 were clogged. In the case when the time from the liquid injection to the ejection was changed to two minutes, non-ejection did not occur.

Second Embodiment

Hereinafter, a second embodiment of the present invention will be described with reference to the drawings. Since the basic structure of the present embodiment is the same as that of the above embodiment, a characteristic structure will be described below.

Figure 7A:
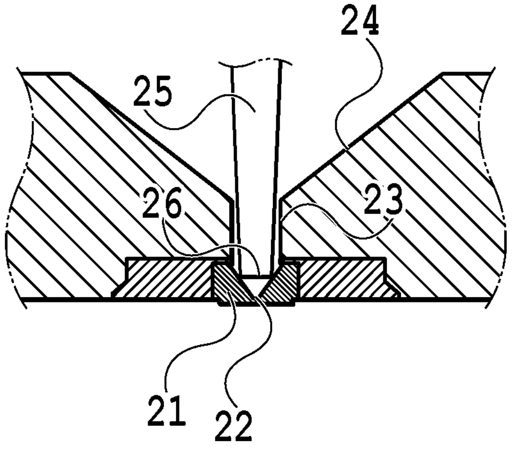
FIG. 7A includes diagrams each illustrating a state where a pipette tip is inserted into a short channel.

FIG. 7A is a diagram illustrating a state where a pipette tip 25 is inserted into a liquid cartridge 11 having a short channel 23. In the case when the length of the channel 23, that is, the distance from the opening portion 24 to the liquid ejection head 21 is short, a tip 26 of the pipette tip 25 comes into contact with the liquid ejection head 21 as illustrated in FIG. 7A and may damage the liquid ejection head 21.

Figure 7B:
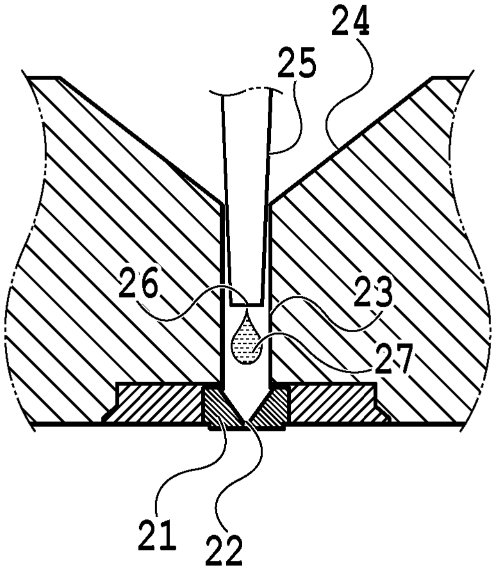
FIG. 7B includes diagrams each illustrating a state where a pipette tip is inserted into a short channel.

To address this, in the present embodiment, as illustrated in FIG. 7B, a structure based on a relationship between the shape and size of the pipette tip 25, and the width and length of the channel 23 is employed in which a tapered portion of the pipette tip 25 comes into contact with an inlet of the channel 23 before the tip 26 of the pipette tip 25 reaches the liquid ejection head 21. The inclined contact surface of the pipette tip 25 comes into contact with the inlet (contact portion) of the channel 23 before the tip 26 reaches the liquid ejection head 21. With this structure, it is possible to prevent damage to the liquid ejection head 21 due to contact of the tip 26 of the pipette tip 25 with the liquid ejection head 21.

It is preferable that the micropipette 104 or the liquid cartridge 11 has a mechanism for keeping the pipette tip 25 (liquid injection unit) from coming into contact with the liquid ejection head 21 in the operation of inserting the pipette tip 25 into the channel. This mechanism may be implemented by a relationship between the micropipette 104 and the liquid cartridge 11 or be equipped to the liquid injection device 101, but is more preferably equipped to the liquid cartridge 11.

An example of the mechanism that can be equipped to the liquid cartridge 11 is a structure in which the channel 23 includes a portion narrower than the pipette tip 25 or is bent so as to prohibit the tip 26 of the pipette tip 25 from reaching the liquid ejection head 21, or the like. Further, there is a structure in which the channel 23 comes into contact with the tapered portion of the pipette tip 25 before the pipette tip 25 reaches the liquid ejection head 21. The aspect ratio of the channel 23 is preferably two or more, in particular, because many general-purpose pipette tips 25 will not come into contact with the liquid ejection head 21, and is more preferably six or more.

Example 4

The liquid was injected in the same method as in Example 1, except that the length of the channel 23 was changed to 1 mm and the width of the channel was changed to 1 mm, so that the aspect ratio of the channel was changed to one. The pipette tip 25 could be inserted into the channel 23 by carefully moving the stage 102 of the liquid injection device 101. However, as a result of mistaking the operating distance of the stage 102 and strongly pushing the pipette tip 25 in, the tip 26 of the pipette tip 25 sometimes came into contact with the liquid ejection head 21 and damaged the liquid ejection head 21.

Third Embodiment

The present embodiment will describe a mode in which an ejection apparatus equipped with the liquid cartridge 11 is used as a compound introduction device for introducing a compound into cells. A liquid ejection head 21 is filled with a liquid containing a compound and cells to which the compound is to be introduced. In the present embodiment, this liquid is referred to as a cell suspension (also referred to as a cell-containing solution). The liquid ejection head 21 may be referred to as a cell processing liquid ejection head. The cell suspension ejected from the liquid ejection head 21 contains cells to which the compound is introduced. In the following description, the compound to be introduced into cells is referred to as an introduction target compound as needed.

(Introduction Target Compound)

The introduction target compound may be selected as appropriate depending on a purpose. Examples of a conceivable compound that can be introduced include nucleic acids, proteins, and labeling substances, and the like. The compound is not limited to these examples as long as the compound is of a size that can be contained in cells to which the compound is to be introduced. However, from the viewpoint of minimizing damage to cells, the size of the compound is preferably ⅕ or smaller, and more, preferably, 1/10 or smaller of the average diameter of cells. Representative compounds applicable in the present embodiment include nucleic acids such as DNA or RNA.

(Cell Type)

Cells to be treated in the present embodiment include adherent cells, floating cells, spheroids (aggregate cells), and the like. The average diameter of the cells is a size ejectable from the ejection port 31, and is, for example, 1 μm or larger and 100 μm or smaller.

(Cell Suspension)

The cell suspension contains at least one introduction target compound to be introduced and at least one kind of cells to which the compound is to be introduced, and contains water as a main component. In the present invention, the cell suspension is one in which cells are dispersed in a liquid. The cells in the cell suspension just have to be in a state where they can be dispersed in the liquid by stirring, and the cells may settle in the liquid while being left at rest. The cell suspension preferably contains other components as needed in order to allow survival of the cells during and after introduction processing.

(Water and Water-Soluble Organic Solvent)

For the cell suspension to be treated in the present embodiment, an aqueous liquid medium containing water or a mixture of water and a water-soluble organic solvent may be used. The cell suspension can be obtained by adding the cells and the introduction target compound to the aqueous liquid medium.

(Compound Introduction Method)

In a compound introduction method in the present embodiment, cells cultured by adhesion culture, suspension culture, or the like, are separated into single cells or small clumps of cells by the action of an enzyme or the like, and thereafter only the cells are sedimented by the difference in specific gravity using a centrifugal separator, or the like. After that, the supernatant medium other than the cells are removed, and then a medium containing an introduction target compound is added, followed by stirring with a pipette or a stirrer to prepare a cell suspension.

The cell suspension thus prepared is passed through a cell strainer having approximately the same diameter as the minimum diameter of the channel in the liquid ejection head 21 to be used, so that large cell aggregates are removed. The cell suspension thus prepared is introduced into the liquid ejection head 21 by using a micropipette or the like. In the case when the cell suspension is smoothly filled up to the ejection ports 31 of the liquid ejection head 21 due to wetting and spreading due to surface tension, the introduction operation is performed immediately after the filling.

After that, energy generating elements in the liquid ejection head 21 are driven to eject the cell suspension from the ejection ports 31 onto a substrate or into a culture solution. The introduction target compound is introduced to the ejected cells.

According to the present invention, it is possible to provide a liquid injection method, a liquid injection device, and a liquid cartridge capable of suppressing a wasteful consumption of a liquid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A liquid injection method of injecting a liquid from a liquid injector to a liquid cartridge including a liquid ejection head that ejects the liquid, a channel that is connected to the liquid ejection head and is capable of supplying the liquid to the liquid ejection head, and an opening portion that is connected to the channel and is provided to be wider than the channel, wherein the channel is a groove, and wherein the liquid is injected from the liquid injector into the liquid cartridge including the channel in which an aspect ratio obtained by dividing a depth of the channel by a width of the channel is six or more, the method comprising:

directly injecting the liquid into the channel.

2. The liquid injection method according to claim 1, wherein, with a liquid injection unit including a tip of the liquid injector and having an outer shape inclined and gradually tapered toward the tip, the liquid is injected with the tip inserted into the channel.

3. The liquid injection method according to claim 2, wherein the liquid is injected while a state where the tip is out of contact with the liquid ejection head is kept by bringing an inclined surface of the liquid injection unit into contact with a part of the channel before the tip reaches the liquid ejection head.

4. The liquid injection method according to claim 1, wherein the liquid is injected with a part of the channel communicating with an atmosphere on the opening portion side.

5. The liquid injection method according to claim 1, wherein, before the liquid is injected into the channel, liquid in the liquid ejection head is removed.

6. The liquid injection method according to claim 1, wherein a liquid containing at least one kind of cells, nucleic acids, proteins, labeling substances, hormones, and ribonucleotides is injected.

7. The liquid injection method according to claim 1, wherein at least one of surfaces of the channel and the opening portion has a contact angle of pure water of ninety degrees or larger.

8. The liquid injection method according to claim 1, wherein the liquid ejection head includes an ejection port forming member in which an ejection port is formed, and a micro-drop contact angle of pure water on the ejection port forming member is forty degrees or greater and ninety degrees or less.

9. The liquid injection method according to claim 1, wherein the liquid is injected from the liquid injector into the liquid cartridge including the liquid ejection head that ejects the liquid by using an ejection principle of an ink jet method.

10. A liquid injection device for injecting a liquid from a liquid injector to a liquid cartridge comprising:

a liquid ejection head that ejects the liquid;

a channel that is connected to the liquid ejection head and is capable of supplying the liquid to the liquid ejection head; and an opening portion that is connected to the channel and is provided to be wider than the channel, wherein the channel is a groove, wherein the liquid is injected from the liquid injector into the liquid cartridge including the channel in which an aspect ratio obtained by dividing a depth of the channel by a width of the channel is six or more, and wherein the liquid injector directly injects the liquid into the channel in the liquid cartridge.

11. The liquid injection device according to claim 10, wherein an outer diameter of a tip of the liquid injector is smaller than a width of the opening portion.

12. The liquid injection device according to claim 10, wherein an outer diameter of a tip of the liquid injector is smaller than a width of the channel.

13. The liquid injection device according to claim 10, wherein the liquid injector includes a liquid injection unit including a tip and having an outer shape inclined and gradually tapered toward the tip, and the liquid is injected with the tip inserted into the channel of the liquid cartridge.

14. The liquid injection device according to claim 12, wherein the liquid injector includes an inclined contact surface of the liquid injector that comes into contact with a part of the channel before the tip reaches the liquid ejection head.

15. The liquid injection device according to claim 10, wherein the liquid is injected with a part of the channel communicating with an atmosphere on the opening portion side.

16. The liquid injection device according to claim 10, wherein, before the liquid is injected into the channel, liquid in the liquid ejection head is removed.

17. The liquid injection device according to claim 10, wherein a liquid containing at least one kind of cells, nucleic acids, proteins, labeling substances, hormones, and ribonucleotides is injected.

18. The liquid injection device according to claim 10, wherein at least one of surfaces of the channel and the opening portion has a contact angle of pure water of ninety degrees or greater.

19. The liquid injection device according to claim 10, wherein the liquid ejection head includes an ejection port forming member in which an ejection port is formed, and a micro-drop contact angle of pure water on the ejection port forming member is forty degrees or greater or ninety degrees or less.

20. The liquid injection device according to claim 10, wherein the liquid is injected from the liquid injector into the liquid cartridge including the liquid ejection head that ejects the liquid by using an ejection principle of an ink jet method.

21. A liquid cartridge into which a liquid is injected from a liquid injector, the liquid cartridge comprising:

a liquid ejection head that ejects the liquid;

a channel that is connected to the liquid ejection head and is capable of supplying the liquid to the liquid ejection head; and an opening portion that is connected to the channel and is provided to be wider than the channel, wherein the channel is a groove, wherein the liquid is injected from the liquid injector into the liquid cartridge including the channel in which an aspect ratio obtained by dividing a depth of the channel by the width of the channel is six or more, and wherein the channel is provided to allow the liquid to be directly injected into the channel and is larger in width than a tip of the liquid injector.

22. The liquid cartridge according to claim 21, wherein the liquid injector includes a liquid injection unit including a tip and having an outer shape inclined and gradually tapered toward the tip, the channel is provided to allow the tip of the liquid injection unit to be inserted into the channel, and the liquid is injected with the tip of the liquid injection unit inserted into the channel.

23. The liquid cartridge according to claim 22, further comprising a contact portion with which an inclined contact surface of the liquid injection unit comes into contact before the tip reaches the liquid ejection head.

24. The liquid cartridge according to claim 22, wherein the channel includes a communication portion in which a part of the channel communicates with an atmosphere on the opening portion side with the tip inserted into the channel.

25. The liquid cartridge according to claim 21, wherein at least one of surfaces of the channel and the opening portion has a contact angle of pure water of ninety degrees or greater.

26. The liquid cartridge according to claim 21, wherein the liquid ejection head includes an ejection port forming member in which an ejection port is formed, and a micro-drop contact angle of pure water on the ejection port forming member is forty degrees or greater or ninety degrees or less.

27. The liquid cartridge according to claim 21, wherein a liquid containing at least one kind of cells, nucleic acids, proteins, labeling substances, hormones, and ribonucleotides is injected.

28. The liquid cartridge according to claim 21, wherein the liquid is injected from the liquid injector into the liquid cartridge including the liquid ejection head that ejects the liquid by using an ejection principle of an ink jet method.

* * * * *